(12) United States Patent
Imamura et al.

(10) Patent No.: US 7,585,480 B2
(45) Date of Patent: Sep. 8, 2009

(54) HIGHLY PURE ULTRA-FINE SIOX POWDER AND METHOD FOR PRODUCTION THEREOF

(75) Inventors: Yasuo Imamura, Tokyo (JP); Ryozo Nonogaki, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 768 days.

(21) Appl. No.: 10/500,737

(22) PCT Filed: Jan. 10, 2003

(86) PCT No.: PCT/JP03/00158

§ 371 (c)(1),
(2), (4) Date: Jul. 6, 2004

(87) PCT Pub. No.: WO03/059816

PCT Pub. Date: Jul. 24, 2003

(65) Prior Publication Data

US 2005/0084439 A1    Apr. 21, 2005

(30) Foreign Application Priority Data

Jan. 10, 2002    (JP)    ............................ 2002-003226

(51) Int. Cl.
*C01B 33/113*    (2006.01)
(52) U.S. Cl. ...................... 423/325; 423/324; 423/335; 423/336; 423/337
(58) Field of Classification Search ................. 423/325, 423/335, 336, 337
See application file for complete search history.

(56) References Cited

U.S. PATENT DOCUMENTS 6,726,990 B1 *   4/2004   Kumar et al. ................ 428/402
6,896,968 B2 *   5/2005   Golecki ....................... 428/446

(Continued)

FOREIGN PATENT DOCUMENTS

JP    5-213606    8/1993

(Continued)

OTHER PUBLICATIONS

P. Bergonzo and I.W. Boyd, "Rapid photo-deposition of silicon dioxide films using 172 nm VUV light" Electronics Letters Mar. 31, 1994 vol. 30 No. 7, pp. 606-608.*

(Continued)

*Primary Examiner*—Ngoc-Yen M Nguyen
*Assistant Examiner*—Diana J Liao
(74) *Attorney, Agent, or Firm*—Oblon, Spivak, McClelland, Maier & Neustadt, P.C.

(57) ABSTRACT

A highly pure ultra-fine SiOx (wherein x is from 0.6 to 1.8) powder having a specific surface area of at least 10 m²/g and a total content of Na, Fe, Al and Cl of at most 10 ppm is provided. The SiOx powder is produced by reacting a monosilane gas with a gas capable of oxidizing the monosilane gas in a non-oxidizing gas atmosphere under a pressure of from 10 to 1000 kPa at a temperature of from 500 to 1000° C. In this case, the amount of the non-oxidizing gas is preferably larger than the total amount of the monosilane gas and oxygen participating in the oxidation of the gas capable of oxidizing the monosilane gas.

11 Claims, 1 Drawing Sheet

U.S. PATENT DOCUMENTS

| 7,164,191 B2 | 1/2007 | Morisaki et al. |
|---|---|---|
| 2005/0084439 A1 | 4/2005 | Imamura et al. |

FOREIGN PATENT DOCUMENTS

| JP | 2001-89125 | 4/2001 |
|---|---|---|
| JP | 2001-158613 | 6/2001 |
| JP | 2001-199716 | 7/2001 |
| JP | 2001-226112 | 8/2001 |
| JP | 2001-348656 A | * 12/2001 |

OTHER PUBLICATIONS

U.S. Appl. No. 10/258,583, filed Nov. 1, 2002, Morisaki, et al.
U.S. Appl. No. 10/500,737, filed Jul. 6, 2004, Imamura, et al.

* cited by examiner

HIGHLY PURE ULTRA-FINE SIOX POWDER AND METHOD FOR PRODUCTION THEREOF

TECHNICAL FIELD

The present invention relates to a highly pure ultra-fine SiOx powder to be used for an interlayer dielectric film of a semiconductor, a gas barrier film, a protective film of an optical component, etc. and a method for producing it.

BACKGROUND ART

A SiOx powder is used as a deposition material to form a deposited film of SiOx on a food packaging film or an optical component because of its high vapor pressure. For example, it is used as a material to form a gas barrier film comprising a SiOx film on a food packaging film to prevent permeation of water vapor or oxygen gas to prevent deterioration of food.

Conventionally, as a method for producing a SiOx powder, a method wherein a mixed material containing silica and metal silicon and/or carbon is subjected to a high temperature treatment in a non-nitriding atmosphere under at least $8 \times 10^4$ Pa to form a SiO-containing gas, which is cooled at a cooling rate of at most 1000° C./sec (JP-A-2001-158613), a method wherein a $SiO_2$ powder is heated in incomplete combustion flame to form Si vapor, which is suboxidized (JP-A-5-213606), etc., have been known.

In order to make the SiOx powder have a high purity in such conventional methods, it is necessary that impurities are not mixed during the time from preparation of a material to collection of a product. However, a special treatment such as purification is required to make the material have a high purity. Further, in order to generate SiO vapor or Si vapor by heating the material, a high temperature operation at from about 1500 to about 2000° C. is required. In such a case, even if a high purity material is employed, impurities such as Na, Al, Mg, Ca and Fe are mixed from e.g. the furnace material, and it is difficult to produce a high purity SiOx powder.

DISCLOSURE OF THE INVENTION

Under these circumstances, it is an object of the present invention to provide a highly pure ultra-fine SiOx powder. This object can be achieved by the present invention having the following gists.

(1) A highly pure ultra-fine SiOx powder, which is represented by the formula SiOx wherein x is from 0.6 to 1.8, which has a specific surface area of at least 10 m²/g, and which has a total content of Na, Fe, Al and Cl of at most 10 ppm.

(2) The SiOx powder according to (1), which is represented by the formula SiOx wherein x is from 0.9 to 1.6.

(3) The SiOx powder according to (1) or (2), wherein the specific surface area is at least 50 m²/g and the total content of Na, Fe, Al and Cl is at most 5 ppm.

(4) A method for producing the highly pure ultra-fine SiOx powder as defined in any one of (1) to (3), which comprises reacting a monosilane gas with a gas capable of oxidizing the monosilane gas in a non-oxidizing gas atmosphere under a pressure of from 10 to 1000 kPa at a temperature of from 500 to 1000° C.

(5) The production method according to (4), wherein the amount of the non-oxidizing gas is at least double the total amount of the monosilane gas and oxygen participating in the oxidation of the gas capable of oxidizing the monosilane gas by molar ratio.

(6) The production method according to (4) or (5), wherein the gas capable of oxidizing the monosilane gas is oxygen, air, $NO_2$, $CO_2$ or $H_2O$.

(7) The production method according to (4), (5) or (6), wherein the non-oxidizing gas is argon or helium.

(8) The production method according to any one of (4) to (7), wherein the reaction is carried out in a non-oxidizing gas atmosphere under a pressure of from 50 to 300 kPa at a temperature of from 500 to 1000° C.

(9) An interlayer dielectric film of a semiconductor device, a gas barrier film of a solar battery, a gas barrier film of a food packaging film or a protective film of an optical component, which is formed from the SiOx powder as defined in any one of the above (1) to (3).

Figure 1:
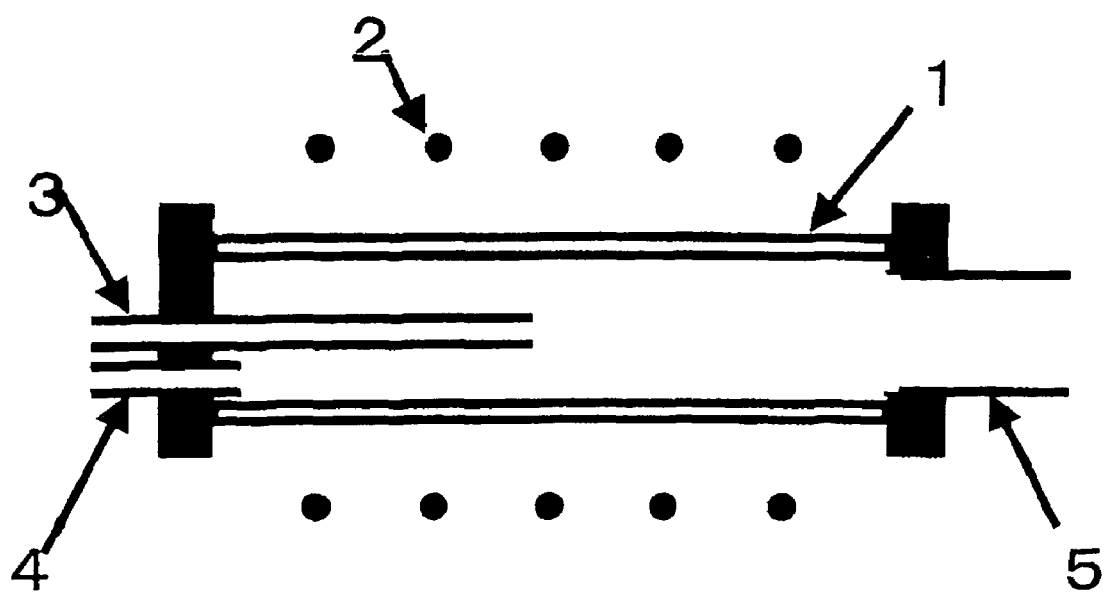
FIG. 1: A schematic view illustrating a reaction apparatus employed in Examples of the present invention.

| Explanation of numerical references |
| --- |
| 1 Reactor |
| 2 Nichrome wire heater |
| 3 Oxidizing gas introduction pipe |
| 4 Monosilane gas introduction pipe |
| 5 Discharge pipe |

BEST MODE FOR CARRYING OUT THE INVENTION

Now, the present invention will be explained in further detail. According to the present invention, a reaction at a low temperature becomes possible by employing a monosilane gas as a material, and thus mixing of impurities from e.g. the furnace material as in a conventional method can be decreased to the lowest level, and as a result, it becomes possible to make the SiOx powder to be formed have a high purity and be ultra-fine.

In the present invention, as the monosilane ($SiH_4$) gas, a commercially available product may be used. The monosilane gas is superior to a silane type gas such as trichlorosilane from such a viewpoint that no chlorine is contained as a constituent. Further, as the gas capable of oxidizing the monosilane gas (hereinafter referred to simply as "oxidizing gas"), in addition to oxygen gas and air, a gas having power to oxidize the monosilane such as $NO_2$, $CO_2$ or $H_2O$ may be used. It is preferred that impurities in such an oxidizing gas are removed as far as possible.

The reaction of the monosilane gas with the oxidizing gas is carried out in a non-oxidizing gas atmosphere under a pressure of from 10 to 1000 kPa at a temperature of from 500 to 1000° C. If the pressure is less than 10 kPa, the formed SiOx film tends to be adhered and grow on the wall of a reactor, and block the discharge part, whereby long-term operation is not easily carried out. Further, if it exceeds 1000 kPa, enormous installation tends to be required to increase the pressure resistance of a reaction apparatus, and further, impurities tend to increase. The preferred pressure is from 50 to 300 kPa.

Further, if the temperature at the reaction site is less than 500° C., $SiO_2$ is mainly formed, and if it exceeds 1000° C., Si tends to be formed, and further, impurities are more likely to be mixed from e.g. the furnace material, and production of a highly pure ultra-fine SiOx powder becomes difficult in either case. The reaction temperature is preferably from 550 to 950° C., particularly preferably from 650 to 850° C. The reaction time (the residual time of both monosilane gas and oxidizing gas in the reactor) is preferably from 0.2 to 1 second.

In the present invention, the reaction of the monosilane gas with the oxidizing gas is carried out in the presence of a non-oxidizing gas, whereby adhesion of the formed SiOx powder to the wall of the reactor can be reduced. As the non-oxidizing gas, an inert gas such as argon or helium is most suitable, however, $H_2$, $N_2$, $NH_3$, CO, etc. may be used within a range of not impairing the reaction. In a case where air is used as the oxidizing gas, since the air contains $N_2$ and $O_2$, both non-oxidizing gas and oxidizing gas are used.

The amount of the non-oxidizing gas is preferably larger than the total amount of the monosilane gas and oxygen participating in the oxidation of the oxidizing gas, and it is preferably at least double, particularly preferably at least 10 times by molar ratio. Here, the amount of the oxygen participating in the oxidation of the oxidizing gas is, in a case of the air for example, the amount of oxygen contained therein, in a case of $NO_2$ and $CO_2$, the amount of oxygen corresponding to one oxygen atom liberated therefrom, and in a case of $H_2O$, the amount of oxygen corresponding to the oxygen atoms constituting it.

As the reactor, use of one produced from a high purity material such as quartz glass is preferred. Its shape may be a cup form with bottom, but a tubular form is preferred, and its direction may be either vertical or horizontal. As the heating method of the reactor, a resistance heating element, high frequency heating, infrared radiation heating, etc., may be employed.

The SiOx powder formed in the reactor is discharged to the outside of the system together with the non-oxidizing gas and a by-product gas, and is recovered by a powder recovery apparatus such as a bag filter.

In the production method of the present invention, Siox powders having various x values in SiOx are produced by changing the proportion of the monosilane gas to the oxidizing gas. If the x value of the SiOx powder of the present invention is outside the range of from 0.6 to 1.8, the deposition rate decreases, and it is thereby necessary to increase the deposition temperature, such being unfavorable. The x value is preferably from 0.9 to 1.6. The x value can be obtained by measuring the Si molar amount in the SiOx powder in accordance with JIS-R6124 (chemical analysis of silicon carbide abrasives) and measuring the oxygen molar amount by means of an O/N simultaneous analyzer (e.g. "TC-136" manufactured by LECO Corporation), to calculate the molar ratio.

The specific surface area of the highly pure ultra-fine SiOx powder of the present invention is at least 10 $m^2/g$. If the specific surface area is less than 10 $m^2/g$, the deposition starting temperature tends to be low. The specific surface area is preferably at least 50 $m^2/g$ particularly preferably from 55 to 100 $m^2/g$. Further, the total content of Na, Fe, Al and Cl in the SiOx powder is at most 10 ppm. If the total content of Na, Fe, Al and Cl exceeds 10 ppm, insulation failure or corrosion may occur when the SiOx powder is used for an interlayer dielectric film or a negative pole active material of a lithium-ion battery. The above total content is preferably at most 5 ppm, particularly preferably at most 3 ppm. These impurities may be measured by means of emission spectrometry such as ICP. Further, of the SiOx powder, the weight average particle size is preferably from 1 to 300 nm, particularly preferably from 1 to 50 nm.

The highly pure ultra-fine Siox powder of the present invention is used as e.g. a deposition material to form an interlayer dielectric film of a semiconductor device, a gas barrier film of a solar battery, a gas barrier film of a food packaging film or a protective film of an optical component.

EXAMPLES

Now, the present invention will be explained in further detail with reference to Examples and Comparative Examples.

Examples 1 to 13 and Comparative Examples 1 to 4

A monosilane gas, an argon gas and an oxygen gas (each having a purity ≧99.999 mass %) were prepared, and each gas was introduced into a reactor made of quartz glass (inner diameter 40 mm×length 800 mm) through a mass flowmeter. The monosilane gas was mixed with the argon gas and supplied so that the mixed gas was blown into a low temperature part of the reactor 1 through a monosilane gas introduction pipe 4 (inner diameter 5 mm) made of quartz glass. Further, the oxygen gas was supplied to a high temperature part in the vicinity of the center part of the reactor through an oxidizing gas introduction pipe 3 (inner diameter 5 mm) made of quartz glass so that the reaction took place at the center part of the reactor (FIG. 1).

The reactor 1 was heated to maintain a predetermined reaction temperature (Table 1) by turning on electricity through a nichrome wire heater 2 wound around the periphery of the reactor. The temperature was adjusted by measuring the temperature by means of a thermocouple located at the center of the center part of the reactor and controlling the electric power of the nichrome wire heater.

The pressure in the reactor was 100±10 kPa which is substantially the same as the atmospheric pressure in many experiments. The pressure reduction less than the atmospheric pressure in the reactor was carried out by adjusting the aperture of the valve while reducing the pressure by a vacuum pump located at the discharge side. Further, the pressurization exceeding the atmospheric pressure was carried out by covering the reactor with a stainless container to make a double structure. In this case, a fibrous heat insulating material was embedded between the nichrome wire heater and the stainless container, and at the same time, an argon gas was introduced between the reactor and the stainless container so that the pressure was the same as the pressure in the reactor so as to balance the gas pressures inside and outside the reactor.

The formed SiOx powder was discharged through a discharge pipe 5 together with a by-product gas and the argon gas, and recovered by a bug filter located on the way. Of the recovered powder, the x value of the SiOx powder, the specific surface area and impurities were measured. The results are shown in Table 1.

In Comparative Example 3 wherein the pressure in the reactor was 5 kPa, only a small amount of the product was recovered, and the most part was adhered to the discharge part of the reactor. Further, the color tone of the recovered product was white, as contrasted with pale brown or liver brown of products obtained in Examples. On the other hand, in Comparative Example 4 wherein the pressure in the reactor was increased to 1200 kPa, no desired specific surface area nor purity was obtained.

TABLE 1

| | Experiment conditions | | | | | | | | | Experiment results | | | | | |
|---|---|---|---|---|---|---|---|---|---|---|---|---|---|---|---|
| | Reaction temperature °C | Reaction pressure kPa | Monosilane gas system | | Oxidizing gas system | | Gas amount Total L/min | Gas mixture ratio | | | Specific surface area m²/g | Amount of impurities | | | | Total amount ppm |
| | | | Monosilane L/min | Argon L/min | Oxygen L/min | Argon L/min | | Monosilane/oxygen | Non-oxidizing gas ratio *1 | x value | | Na ppm | Al ppm | Cl ppm | Fe ppm | |
| Comp. Ex. 1 | 427 | 103 | 0.16 | 15.84 | 0.40 | 2.00 | 18.40 | 0.40 | 32 | 1.9 | 80 | 1.2 | 0.5 | 0.8 | 1.1 | 3.6 |
| Ex. 1 | 527 | 103 | 0.16 | 15.84 | 0.40 | 2.00 | 18.40 | 0.40 | 32 | 1.7 | 76 | 1.2 | 0.7 | 1.2 | 0.5 | 3.6 |
| Ex. 2 | 627 | 103 | 0.16 | 15.84 | 0.40 | 2.00 | 18.40 | 0.40 | 32 | 1.2 | 75 | 1.5 | 0.9 | 1.0 | 0.3 | 3.7 |
| Ex. 3 | 727 | 103 | 0.16 | 15.84 | 0.40 | 2.00 | 18.40 | 0.40 | 32 | 1.0 | 71 | 1.8 | 1.2 | 2.0 | 1.0 | 6.0 |
| Ex. 4 | 827 | 103 | 0.16 | 15.84 | 0.40 | 2.00 | 18.40 | 0.40 | 32 | 0.9 | 59 | 2.1 | 1.6 | 2.5 | 1.2 | 7.4 |
| Ex. 5 | 927 | 103 | 0.16 | 15.84 | 0.40 | 2.00 | 18.40 | 0.40 | 32 | 0.7 | 42 | 2.5 | 3.2 | 2.4 | 0.8 | 8.9 |
| Comp. Ex. 2 | 1027 | 103 | 0.16 | 15.84 | 0.40 | 2.00 | 18.40 | 0.40 | 32 | 0.3 | 22 | 3.0 | 4.1 | 3.5 | 3.1 | 13.7 |
| Ex. 6 | 727 | 103 | 2.40 | 2.00 | 6.00 | 6.00 | 16.40 | 0.40 | 1.0 | 0.7 | 12 | 1.0 | 2.4 | 2.1 | 1.1 | 6.6 |
| Ex. 7 | 727 | 103 | 0.38 | 11.50 | 0.96 | 4.80 | 17.64 | 0.40 | 12 | 0.8 | 18 | 0.9 | 1.8 | 1.9 | 0.8 | 5.4 |
| Ex. 8 | 727 | 103 | 0.24 | 14.40 | 0.60 | 3.00 | 18.24 | 0.40 | 21 | 0.9 | 31 | 1.5 | 1.9 | 2.3 | 0.7 | 6.4 |
| Ex. 9 | 727 | 103 | 0.11 | 11.10 | 0.28 | 7.00 | 18.49 | 0.39 | 46 | 1.3 | 91 | 1.2 | 2.2 | 2.1 | 1.2 | 6.7 |
| Ex. 10 | 727 | 103 | 0.16 | 15.84 | 0.20 | 2.00 | 18.20 | 0.80 | 50 | 0.6 | 62 | 0.8 | 1.6 | 1.8 | 1.1 | 5.3 |
| Ex. 11 | 727 | 103 | 0.16 | 15.84 | 0.80 | 4.00 | 20.80 | 0.20 | 21 | 1.6 | 38 | 1.4 | 1.2 | 2.2 | 0.9 | 5.7 |
| Comp. Ex. 3 | 727 | 5 | 0.16 | 15.84 | 0.40 | 2.00 | 18.40 | 0.40 | 32 | 1.9 | 95 | 0.9 | 0.7 | 1.0 | 0.3 | 2.9 |
| Ex. 12 | 727 | 20 | 0.16 | 15.84 | 0.40 | 2.00 | 18.40 | 0.40 | 32 | 1.4 | 74 | 1.5 | 1.6 | 1.2 | 0.7 | 5.0 |
| Ex. 13 | 727 | 700 | 0.16 | 15.84 | 0.40 | 2.00 | 18.40 | 0.40 | 32 | 0.8 | 15 | 2.1 | 2.4 | 2.1 | 1.0 | 7.6 |
| Comp. Ex. 4 | 727 | 1200 | 0.16 | 15.84 | 0.40 | 2.00 | 18.40 | 0.40 | 32 | 0.7 | 3 | 6.2 | 3.8 | 2.9 | 5.2 | 18.1 |

*1: Non-oxidizing gas ratio = (amount of argon gas)/{(amount of monosilane gas) + (amount of oxygen gas)}

It is found from Table 1 that the highly pure ultra-fine Siox (wherein x is from 0.6 to 1.8) of the present invention can be produced only by the production method of the present invention.

INDUSTRIAL APPLICABILITY

According to the present invention, a highly pure ultra-fine $SiO_x$ (wherein x is from 0.6 to 1.8) powder having a specific surface area of at least 10 m²/g and a total content of Na, Fe, Al and Cl of at most 10 ppm can be provided. The highly pure ultra-fine SiOx powder of the present invention can be used as a deposition material for production of an interlayer dielectric film of a semiconductor, a plastic liquid crystal panel, a gas barrier film of an amorphous solar battery, a gas barrier film of a food packaging film, etc., or as a negative pole active material of a lithium-ion battery. According to the production method of the present invention, the above highly pure ultra-fine SiOx powder can be easily produced.

The invention claimed is:

1. A method for producing a powder represented by the formula $SiO_x$ comprising:
reacting monosilane gas, $SiH_4$, with a gas containing oxygen capable of oxidizing the monosilane gas in the presence of a non-oxidizing gas, under a pressure of from 10 to 1000 kPa at a high temperature of from 500 to 1000° C. in a reaction zone to produce $SiO_x$ powder, wherein
x is from 0.6 to 1.8,
the $SiO_x$ powder has a specific surface area of at least 10 m²/g and a total
content of Na, Fe, Al and Cl of at most 10 ppm, and
the gas capable of oxidizing the monosilane gas is supplied to the reaction zone without prior mixing with the monosilane gas, and the high temperature in the reaction zone is obtained by heating the reaction zone on its periphery.

2. The method according to claim 1, wherein on a molar basis, the non-oxidizing gas is at least twice the total amount of the monosilane gas and oxygen contained in the gas capable of oxidizing the monosilane gas.

3. The method according to claim 1, wherein the gas capable of oxidizing the monosilane gas is oxygen, air, $NO_2$, $CO_2$, or $H_2O$.

4. The method according to claim 1, wherein the non-oxidizing gas is argon or helium.

5. The method according to claim 1, wherein the pressure is from 50 to 300 kPa and the temperature is from 500 to 1000° C.

6. The method according to claim 1, wherein the reaction zone and gas introduction pipes are made of quartz.

7. The method according to claim 1, wherein the value of x in the formula $SiO_x$ is produced by changing the proportion of the monosilane gas to the oxidizing gas.

8. The method according to claim 1, wherein the $SiO_x$ powder is recovered by a powder recovery apparatus.

9. The method according to claim 1, wherein the residual time of the monosilane gas and oxidizing gas in the reaction zone is from 0.2 to 1 second.

10. The method according to claim 1, wherein the reacting is at a temperature of 550 to 950° C.

11. The method according to claim 1, wherein the reacting is at a temperature of 650 to 850° C.

* * * * *